US010503430B2

(12) United States Patent
Wang et al.

(10) Patent No.: US 10,503,430 B2
(45) Date of Patent: Dec. 10, 2019

(54) METHOD AND DEVICE FOR CLEARING DATA AND ELECTRONIC DEVICE

(71) Applicant: CHEETAH MOBILE INC., Beijing (CN)

(72) Inventors: Guanxiang Wang, Beijing (CN); Bohui Zhang, Beijing (CN)

(73) Assignee: CHEETAH MOBILE INC., Beijing (CN)

( * ) Notice: Subject to any disclaimer, the term of this patent is extended or adjusted under 35 U.S.C. 154(b) by 79 days.

(21) Appl. No.: 15/902,089

(22) Filed: Feb. 22, 2018

(65) Prior Publication Data

US 2018/0341426 A1 Nov. 29, 2018

(30) Foreign Application Priority Data

May 25, 2017 (CN) .......................... 2017 1 0378449

(51) Int. Cl.
*H04L 29/06* (2006.01)
*G06F 3/06* (2006.01)
(Continued)

(52) U.S. Cl.
CPC .......... *G06F 3/0652* (2013.01); *G06F 3/0608* (2013.01); *G06F 3/0673* (2013.01); *G06F 9/468* (2013.01); *G06F 12/0891* (2013.01); *G06F 16/9574* (2019.01); *G06F 21/6209* (2013.01); *G06F 2212/1044* (2013.01); *G06F 2212/161* (2013.01); *G06F 2221/2143* (2013.01)

(58) Field of Classification Search
None
See application file for complete search history.

(56) References Cited

U.S. PATENT DOCUMENTS 8,387,141 B1 * 2/2013 Zhukov ............. H04W 12/1208
726/22
2012/0209923 A1 * 8/2012 Mathur ................... G06F 21/53
709/206
(Continued)

OTHER PUBLICATIONS

Cozma, "How to clear app cache and app data in Android 6.0 Marshmallow", CNET, Nov. 2, 2015 (Year: 2015).*
(Continued)

*Primary Examiner* — Ryan Bertram
*Assistant Examiner* — Trang K Ta
(74) *Attorney, Agent, or Firm* — Hodgson Russ LLP

(57) ABSTRACT

A method and a device for clearing data, and an electronic device are disclosed in embodiments of the present disclosure. The method includes: launching a target application; acquiring a clearing instruction; judging whether the operation system is of a preset version or of a higher version than the preset version; judging whether an auxiliary permission is available; if the operation system is of a lower version than the preset version, or if the operation system is of the preset version or the higher version and the auxiliary permission is unavailable, triggering the target application to clear data stored in the electronic device; and if the operation system is of the preset version or of the higher version and the auxiliary permission is available, invoking a system clearing interface of the electronic device, simulating a click on the system clearing interface, so as to trigger and start a system clearing progress.

15 Claims, 4 Drawing Sheets

(51) Int. Cl.
*G06F 12/0891* (2016.01)
*G06F 21/62* (2013.01)
*G06F 16/957* (2019.01)
*G06F 9/46* (2006.01)

(56) References Cited

U.S. PATENT DOCUMENTS

2013/0097659 A1\* 4/2013 Das ................. G06F 21/629
 726/1
2017/0139813 A1\* 5/2017 Lin .................. G06F 11/36
2018/0341427 A1\* 11/2018 Wang ............... G06F 3/0604

OTHER PUBLICATIONS

Dallas Thomas, "What is Root?", May 19, 2017 (Year: 2017).\*
Technetexperts, "How to change th epackage name in Android STudio", Feb. 1, 2016 (Year: 2016).\*
Android, "How to simulate a button click using code?", May 2016 (Year: 2016).\*

\* cited by examiner

METHOD AND DEVICE FOR CLEARING DATA AND ELECTRONIC DEVICE

CROSS-REFERENCE TO RELATED APPLICATIONS

This application claims priority to and benefits of Chinese Patent Application Serial No. 201710378449.5, filed with the State Intellectual Property Office of P. R. China on May 25, 2017, the entire content of which is incorporated herein by reference.

TECHNICAL FIELD

The present disclosure relates to the field of computer technology, and more particularly, to a method for clearing data, a device for clearing data and an electronic device.

BACKGROUND

At present, many electronic devices, such as mobile phones, tablet computers, smart televisions and the like, are installed with Android operation system. In order to simply works and lives, when the electronic device is used by a user, some applications (APP for short) may be installed on the electronic device gradually. An APP may generate data during running. The data may be stored in a storage path corresponding to a package name of the APP. After a period of time, the electronic device may suffer from insufficient memory space, which may influence normal launch of the App or lower a response speed of the APP. At this time, the user commonly triggers an operation to clear the data of the APP installed on the electronic device, for example deleting cached files or data files corresponding to the APP. In detail, the data stored in the electronic device may be cleared via an APP with a capacity of data clearing as well as via a system clearing function of the operation system.

SUMMARY

Embodiments of the present disclosure provide a method for clearing data, a device for clearing data and an electronic device.

Embodiments of the present disclosure provide a method for clearing data. The method is applied to an electronic device having an operation system. The method includes the followings.

A target application is launched.

A clearing instruction triggered by a user is acquired.

It is judged whether the operation system is of a preset version or of a higher version than the preset version.

It is judged whether an auxiliary permission is available to the user.

If the operation system is of a lower version than the preset version, or if the operation system is of the preset version or the higher version and the auxiliary permission is unavailable to the user, the target application is triggered to clear data stored in the electronic device.

If the operation system is of the preset version or of the higher version and the auxiliary permission is available to the user, a system clearing interface of the electronic device is invoked, a click on the system clearing interface input by the user is simulated, so as to trigger and start a system clearing progress. The data stored in the electronic device is cleared by the system clearing progress.

Embodiments of the present disclosure provide a device for clearing data. The device is applied to an electronic device having an operation system. The device includes a launching unit, an acquiring unit, a first judging unit, a second judging unit, a first processing unit and a second processing unit.

The launching unit is configured to launch a target application.

The acquiring unit is configured to acquire a clearing instruction triggered by a user.

The first judging unit is configured to judge whether the operation system is of a preset version or of a higher version than the preset version.

The second judging unit is configured to judge whether an auxiliary permission is available to the user.

The first processing unit is configured to, if the operation system is of a lower version than the preset version, or if the operation system is of the preset version or the higher version and the auxiliary permission is unavailable to the user, trigger the target application to clear data stored in the electronic device.

The second processing unit is configured to, if the operation system is of the preset version or of the higher version and the auxiliary permission is available to the user, invoke a system clearing interface of the electronic device, and to simulate a click on the system clearing interface input by the user, so as to trigger and start a system clearing progress. The data stored in the electronic device is cleared by the system clearing progress.

Embodiments of the present disclosure provide an electronic device. The electronic device includes a processor, a memory, a display, a communication interface and a bus.

The processor, the memory, the display and the communication interface are coupled and communicate with each other via the bus.

The memory is configured to store computer executable program codes, the executable program codes include instructions. When the instructions are executed by the processor, the instructions is configured to cause the electronic device to execute a method for clearing data according to embodiments of the first aspect or possible implementations of embodiments of the first aspect.

A computer program product is provided. When instructions included in the computer program product are executed by a processor, a method for clearing data is executed. The method includes the followings.

A target application is launched.

A clearing instruction triggered by a user is acquired.

It is judged whether the operation system is of a preset version or of a higher version than the preset version.

It is judged whether an auxiliary permission is available to the user.

If the operation system is of a lower version than the preset version, or if the operation system is of the preset version or the higher version and the auxiliary permission is unavailable to the user, the target application is triggered to clear data stored in the electronic device.

If the operation system is of the preset version or of the higher version and the auxiliary permission is available to the user, a system clearing interface of the electronic device is invoked, a click on the system clearing interface input by the user is simulated, so as to trigger and start a system clearing progress. The data stored in the electronic device is cleared by the system clearing progress.

A storage medium is provided. When instructions stored in the storage medium are executed by a processor of an electronic device, the device may perform a method for clearing data. The method includes the followings.

A target application is launched.

A clearing instruction triggered by a user is acquired.

It is judged whether the operation system is of a preset version or of a higher version than the preset version.

It is judged whether an auxiliary permission is available to the user.

If the operation system is of a lower version than the preset version, or if the operation system is of the preset version or the higher version and the auxiliary permission is unavailable to the user, the target application is triggered to clear data stored in the electronic device.

If the operation system is of the preset version or of the higher version and the auxiliary permission is available to the user, a system clearing interface of the electronic device is invoked, a click on the system clearing interface input by the user is simulated, so as to trigger and start a system clearing progress. The data stored in the electronic device is cleared by the system clearing progress.

BRIEF DESCRIPTION OF THE DRAWINGS

In order to explicitly illustrate technical solutions in embodiments of the present disclosure, a brief introduction for the accompanying drawings used when describing the embodiments will be listed as follows. Apparently, the drawings described below are only corresponding to some embodiments of the present disclosure, and those skilled in the art may obtain other drawings according to these drawings without creative labor.

DETAILED DESCRIPTION

Figure 1:
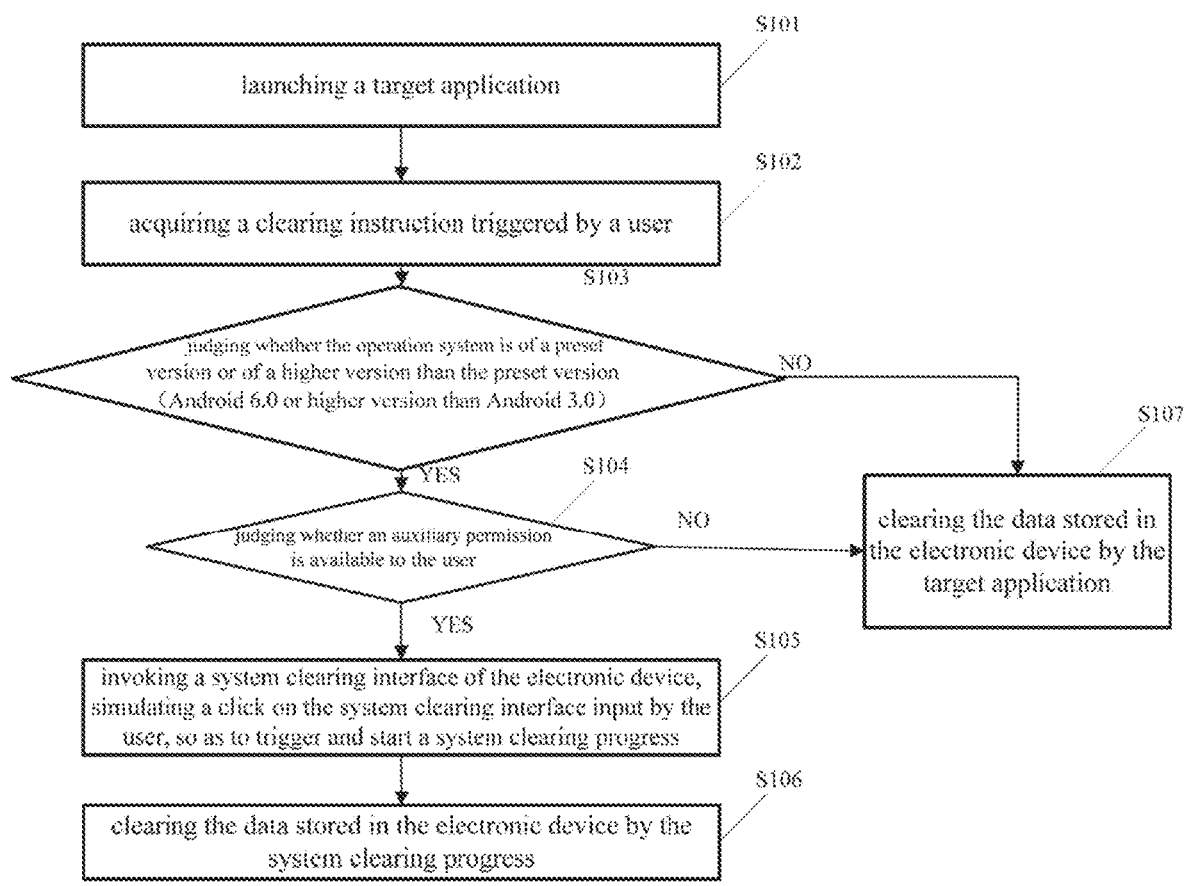
FIG. 1 is a flow chart illustrating a method for clearing data provided in an embodiment of the present disclosure.

Embodiments of the present disclosure provide a method for processing data, an associated device and an electronic device, which may effectively clear data stored in the electronic device, and avoid a down phenomenon during clearing the data.

In order to better understand technical solutions of embodiments of the present disclosure by those skilled in the art, in the following, more clear and complete descriptions will be made, in combination with drawings, to the technical solutions of the embodiments of the present disclosure. Obviously, embodiments described herein are merely a part instead of all of embodiments of the present disclosure. Based on the embodiments of the present disclosure, other embodiments obtained by those skilled in the art without any inventive labors are all within the protection scope of the present disclosure.

The method for clearing data, the associated device and the electronic device may be described respectively as follows.

Terms such as "first", "second", "third" and "fourth" are configured herein for distinguishing different subjects, but may not describe a particular sequence. Furthermore, the terms such as "include", "comprise" and any other variations of them are intended to cover non-exclusive inclusion. For example, it includes a series of process, methods, systems, products, or devices of steps or modules, and is not limited to the listed steps or modules, alternatively, it also includes steps or modules that are not listed, and alternatively, it also includes other steps or modules inherent to the process, methods, products or devices.

Compared with a case that data stored in an electronic device is cleared via a system clearing progress, a third party APP may perform personalized clearing on the data stored in the electronic device with pertinence. At present, when the third party APP is triggered and launched to clear the data, the third party APP sometimes may invoke the system clearing progress, such that a clearing progress of the App and the clearing progress of the system clearing progress may co-exist, and clear the data stored in the electronic device in parallel.

Applicant of the present disclosure found that, when the clearing progress of the App and the clearing progress of the system clearing progress perform data cleaning in parallel, a case that the same data in the same path is deleted by both of the two clearing progress may occur. When this case occurs, the electronic device sometimes cannot run smoothly even may be down. When the electronic device is down, on one hand, the data stored in the electronic device cannot be deleted, on other hand, the electronic device remains in a data clearing interface. When the electronic device is down, confidence of the user to the third party APP may be harmed, even worse, the third party APP may be removed by the user from the electronic device.

In embodiments of the present disclosure, a device may be referred as "user equipment" (UE for short), a "mobile terminal" and the like. When the device is installed with an android operation system, there are different permissions of clearing data stored in the device regarding to different versions of the android operation system, such as a lower version than Android 6.0, a version of Android 6.0 and a higher version than Android 6.0, and there are different influences on a system clearing progress depending on the different permissions corresponding to the above-mentioned versions and whether an auxiliary permission is available. Therefore, both a version of the operation system and whether the auxiliary permission is available are judged. When the version of the operation system is the lower version than a preset version (such as a version lower than 6.0), or when the operation system is the preset version or the higher version than the preset version (such as the version of Android 6.0 or a version higher than 6.0) and the auxiliary permission is unavailable to the user, a target application is triggered to clear data stored in the electronic device. Further, when the operation system of the electronic device is of Android 6.0 or of a higher version than Android 6.0, and the auxiliary permission is available to the user, the system clearing progress is triggered to clear the data stored in the electronic device. With embodiments of the present disclosure, the data stored in the electronic device may be cleared effectively and a down phenomenon of the electronic device may be avoided during the data clearing.

With reference to FIG. 1, FIG. 1 is a flow chart illustrating a method for clearing data provided in embodiments of the present disclosure. The method illustrated as FIG. 1 includes the followings.

At block S101, a target application is launched.

The target application may be a third party APP installed on a mobile phone, configured to clear junk files in the mobile phone.

At block S102, a clearing instruction triggered by the user is acquired.

The clearing instruction may be triggered by clicking on a clearing key on an interface of the third party APP.

At block S103, it is judged whether an operation system of an electronic device is of a preset version or of a higher version than the preset version.

It may be understood that, before it is judged whether the operation system is of the preset version or of the higher version than the preset version, version information of the operation system of the electronic device is acquired.

Applicant of the present disclosure has found that, some limitations are set to permissions of a third party APP that is not the system clearing progress by the operation system of Android 6.0 and the higher version than Android 6.0. As a result, the third party APP cannot access and delete files in some paths of the electronic device. Therefore, In some possible implementations of the present disclosure, the preset version may be Android 6.0. When the version of the operation system of the electronic device is Android 6.0 or the higher version than Android 6.0, block S104 is executed. When the version of the operation system of the electronic device is the lower version than Android 6.0, block S107 is executed. It should be noted that, the higher version than Android 6.0 and the lower version than Android 6.0 do not include Android 6.0.

At block S104, it is judged whether an auxiliary permission is available to the user.

When the auxiliary permission is available, a click operation of the user may be simulated by the application.

When the auxiliary permission is available, block S105 is executed. When the auxiliary permission is unavailable, block S107 is executed.

At block S107, the data stored in the electronic device is cleared by the target application.

It should be noted that, when the version of the operation system of the electronic device is the lower version than Android 6.0, when the data stored in the electronic device is cleared by the target application, a cached file corresponding to respective application is deleted from an operation system root directory and a Data root directory of the electronic device by the target application.

Figure 2:
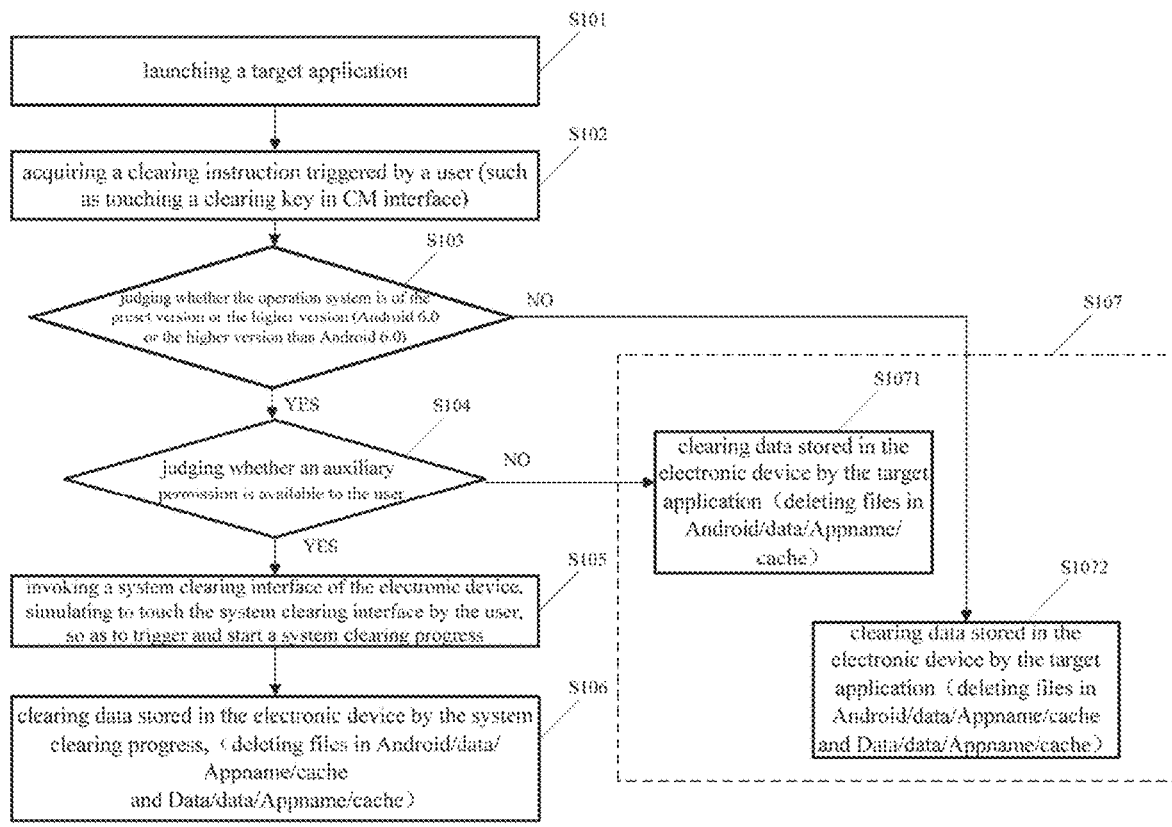
FIG. 2 a flow chart illustrating a method for clearing data provided in another embodiment of the present disclosure.

Clearing the file corresponding to UC browser is taken as an example for illustration. Illustrated as S1072 in FIG. 2, the files included in "Android/data/com.UCMobile.intl/cache" and "Data-data/com.UCMobile.intl/cache" are deleted.

When the operation system of the electronic device is Android 6.0 or the higher version than Android 6.0 and the auxiliary permission is unavailable to the user, when the data stored in the electronic device is cleared by the target application, the cached file corresponding to respective application is deleted from the operation system root directory of the electronic device by the target application. Illustrated as S1071 in FIG. 2, the files included in "Android/data/com.UCMobile.intl/cache" are deleted by the target application.

In some possible implementations of the present disclosure, clearing the data stored in the electronic device by the target application includes: clearing cached data corresponding to one or more applications not in a white list of the electronic device by the target application.

In some possible implementations of the present disclosure, when the version of the operation system of the electronic device is of the lower version than the preset version, such as a version lower than Android 6.0, clearing the cached data corresponding to the one or more applications not in the white list of the electronic device by the target application includes the followings. A cached file corresponding to the one or more applications not in the white list is deleted from the operation system root directory and the Data root directory of the electronic device by the target application. That is, the files included in Android/data/Appname/cache and Data/data/Appname/cache are deleted. Appname is a package name corresponding to respective application. For example, if a UC browser is an application not in the white list, and a package name Appname of an installation package of the UC browser is com.UCMobile.intl, when the data related to the UC browser is cleared by the target application, the files in the Android/data/com.UCMobile.intl/cache and Data/data/com.UCMobile.intl/cache are deleted.

In some possible implementations of the present disclosure, when the version of the operation system of the electronic device is Android 6.0 or the higher version than Android 6.0, and when the auxiliary permission is unavailable to the user, clearing cached data corresponding to the one or more applications not in the white list of the electronic device by the target application includes the followings.

A file corresponding to respective application not in the white list of the electronic device is deleted from Android/data/com.UCMobile.intl/cache by the target application. Appname is a package name of the applications. Taking UC browser as an example, files included in Android/data/com.UCMobile.intl/cache are deleted by the target application.

At block S105, a system clearing interface of the electronic device is invoked, a click on the system clearing interface input by the user is simulated, so as to trigger and start the system clearing progress.

At block S106, the data stored in the electronic device is cleared by the system clearing progress.

In detail, files corresponding to respective application of the electronic device are deleted from Android/data/Appname/cache and Data/data/Appname/cache by the system clearing progress. Appname is the package name of each of the one or more applications. Taking UC browser as an example, files included in Android/data/com.UCMobile.intl/cach and Data/data/com.UCMobile.intl/cache are deleted by the target application.

Figure 3:
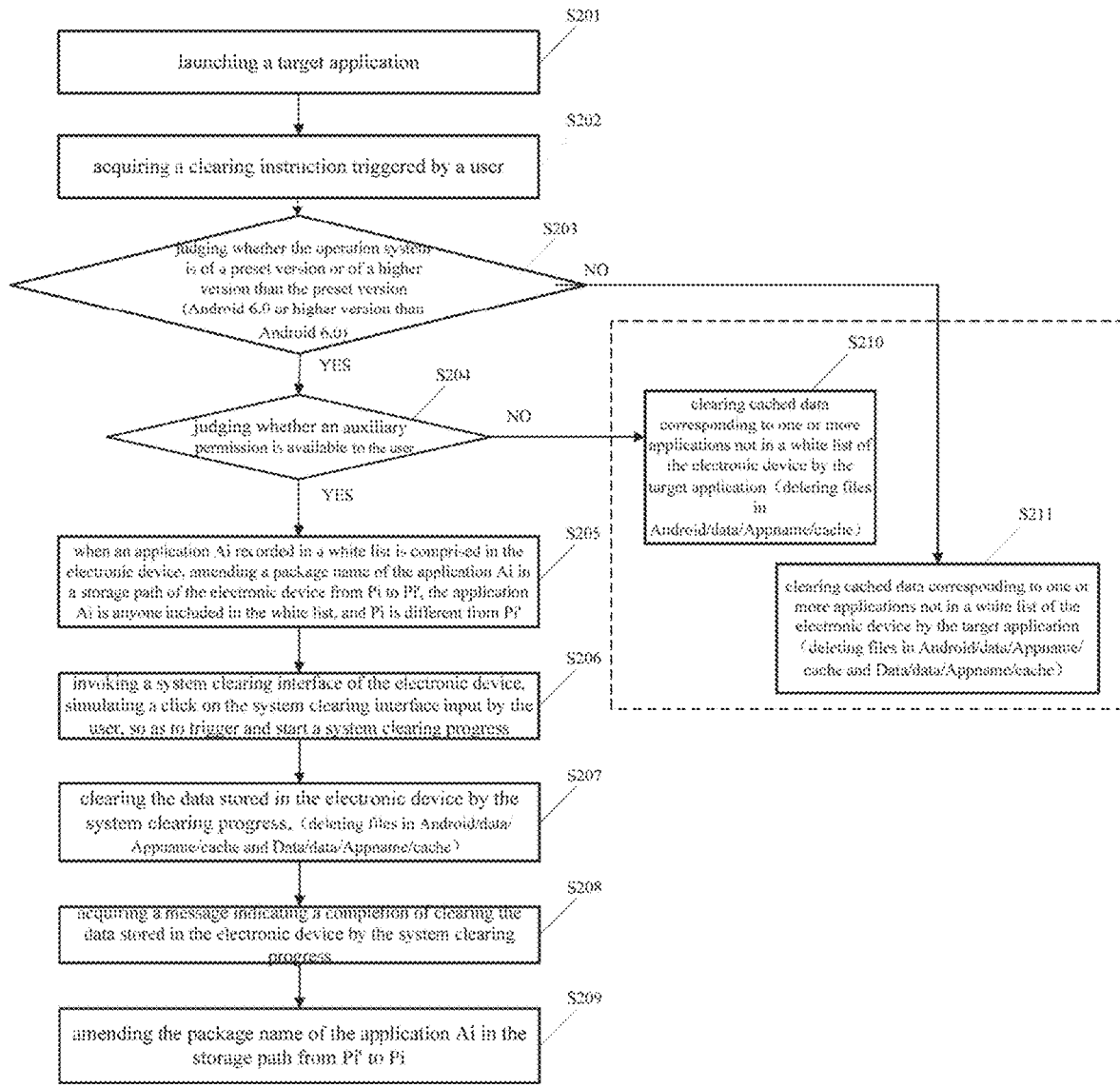
FIG. 3 is a flow chart illustrating a method for clearing data provided in another embodiment of the present disclosure.

With reference to FIG. 3. FIG. 3 is a flow chart illustrating a method for clearing data provided in an embodiment of the present disclosure. The method illustrated as FIG. 3 includes the followings.

At block S201, a target application is launched.

The target application may be a third party APP installed on a mobile phone, for clearing junk files in the mobile phone.

At block S202, a clearing instruction triggered by a user is acquired.

The clearing instruction may be triggered by the user by clicking on a clearing key on an interface of the third party APP.

At block S203, it is judged whether an operation system of an electronic device is of a preset version or of a higher version than the preset version.

It may be understood that, before it is judged whether the operation system is of the preset version or of the higher version than the preset version, version information of the operation system of the electronic device is acquired.

In some possible implementations of the present disclosure, the preset version may be Android 6.0. When the version of the operation system of the electronic device is Android 6.0 or the higher version than Android 6.0, block S204 is executed. When the version of the operation system of the electronic device is the lower version than Android 6.0, block S211 is executed. It is to be illustrated that, the higher version than Android 6.0 and the lower version than Android 6.0 do not include Android 6.0.

At block S204, it is judged whether an auxiliary permission is available to the user.

When the auxiliary permission is available, a click operation of the user may be simulated by the application.

When the auxiliary permission is available, block S205 is executed. When the auxiliary permission is unavailable, block S210 is executed.

At block S205, when an application Ai is included in a white list of the electronic device, a package name of the application Ai in a storage path of the electronic device is amended from Pi to Pi'. The application Ai is any one of applications recorded in the white list and the package name Pi is different from the package name Pi'.

It is to be noted that, after the package name of the application Ai in the storage path of the electronic device is amended to Pi' from Pi, when the data stored in the electronic device is deleted, a storage path actually corresponding to the application Ai cannot be searched according to the package name Pi of the application Ai, thus, it is impossible to clear the data corresponding to the application Ai by the system clearing progress.

If the application WeChat is one included in the white list, and the package name of WeChat is com.tencent.mm, the package name com.tencent.mm in the storage paths Android/data/com.tencent.mm/cache and Data/data/com.tencent.mm/cache of the application WeChat may be amended to com.tencent1.mm.

At block S206, a system clearing interface of the electronic device is invoked, a click on of the system clearing interface input by the user is simulated, so as to trigger and start the system clearing progress.

At block S207, the data stored in the electronic device may be cleared by the system clearing progress.

In detail, files included in Android/data/Appname/cache and Data/data/Appname/cache are deleted. For example, when data corresponding to the WeChat is cleared by the system clearing progress, files in Android/data/com.tencent.mm/cache and Datadata/com.tencent.mm/cache are deleted, while files included in actual storage paths (such as, the storage paths Android/data/com.tencent1.mm/cache and Datadata/com.tencent1.mm/cache) corresponding to the WeChat are not deleted.

At block S208, a message indicating a completion of clearing the data stored in the electronic device by the system clearing progress is acquired.

After files corresponding to each application are deleted from Android/data/Appname/cache and Data/data/Appname/cache by the system clearing progress according to package names of the applications installed on the electronic device, the message indicating that the data stored in the electronic device is cleared completely by the system clearing progress. It is to be illustrated that, when the data is cleared by the system clearing progress, a general package name corresponding to the application is used. For example, a package name com.tencent.mm instead of an amended package name com.tencent1.mm in block S206 is utilized. Therefore, after the package name of WeChat is amended, data in actual storage paths of WeChat is not deleted by the system clearing progress actually.

At block S209, the package name of the application Ai in the storage path is amended to Pi from Pi'.

Taking descriptions at block S206 as an example, the storage paths are amended to android/data/com.tencent.mm/cache and Data/data/com.tencent.mm/cache from Android/data/com.tencent1.mm/cache and Data/data/com.tencent1.mm/cache respectively. Therefore, subsequent operations of the user on WeChat may not be influenced.

With embodiments of the present disclosure, the data stored in the electronic device may be cleared effectively and a down phenomenon of the electronic device may be avoided during the data clearing. Furthermore, it may prevent from clearing data corresponding to an application in the white list.

Figure 4:
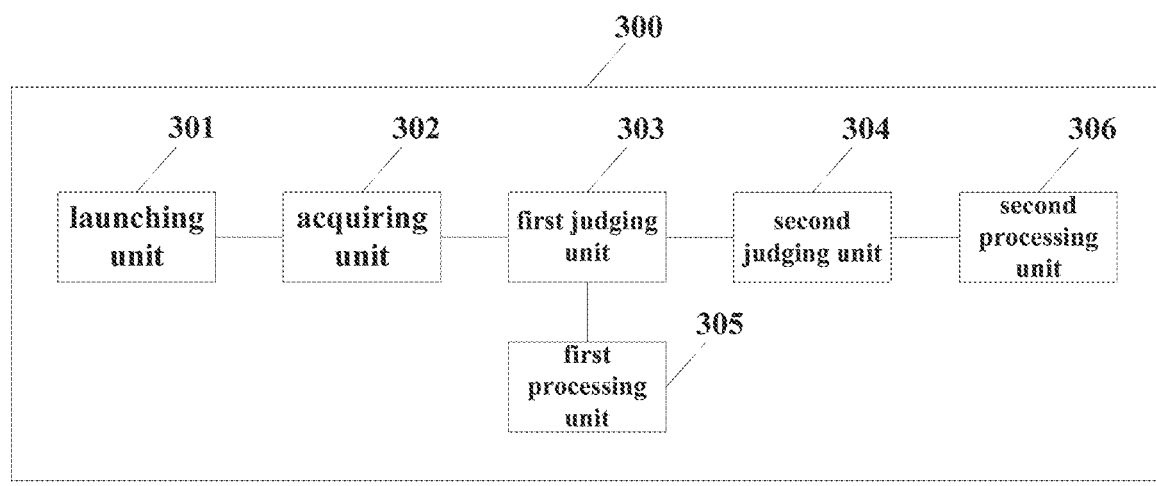
FIG. 4 is a block diagram illustrating a device for clearing data provided in an embodiment of the present disclosure.

With reference to FIG. 4, FIG. 4 is a block diagram illustrating a device for clearing data provided in an embodiment of the present disclosure. As illustrated in FIG. 4, the device 300 for clearing data provided in an embodiment of the present disclosure may include a launching unit 301, an acquiring unit 302, a first judging unit 303, a second judging unit 304, a first processing unit 305 and a second processing unit 306.

The launching unit 301 is configured to execute block S101 of a method provided in embodiments of the present disclosure illustrated as FIG. 1. Descriptions of implementations of the launching unit 301 may refer to corresponding descriptions to block S101 of the method provided in embodiments of the present disclosure illustrated as FIG. 1, which are not elaborated herein.

The acquiring unit 302 is configured to execute block S102 of a method provided in embodiments of the present disclosure illustrated as FIG. 1. Descriptions of implementations of the acquiring unit 302 may refer to corresponding descriptions to block S102 of the method provided in embodiments of the present disclosure illustrated as FIG. 1, which are not elaborated herein.

The first judging unit 303 is configured to execute block S103 of a method provided in embodiments of the present disclosure illustrated as FIG. 1. Descriptions of implementations of the first judging unit 303 may refer to corresponding descriptions to block S103 of the method provided in embodiments of the present disclosure illustrated as FIG. 1, which are not elaborated herein.

The second judging unit 304 is configured to execute block S104 of a method provided in embodiments of the present disclosure illustrated as FIG. 1. Descriptions of implementations of the second judging unit 304 may refer to corresponding descriptions to block S104 of the method provided in embodiments of the present disclosure illustrated as FIG. 1, which are not elaborated herein.

The first processing unit 305 is configured to execute block S107 of a method provided in embodiments of the present disclosure illustrated as FIG. 1. Descriptions of implementations of the first processing unit 305 may refer to corresponding descriptions to block S107 of the method provided in embodiments of the present disclosure illustrated as FIG. 1, which are not elaborated herein.

The second processing unit 306 is configured to execute blocks S105 and S106 of a method provided in embodiments of the present disclosure illustrated as FIG. 1. Descriptions of implementations of the second processing unit 306 may refer to corresponding descriptions to blocks S105 and S106 of the method provided in embodiments of the present disclosure illustrated as FIG. 1, which are not elaborated herein.

It can be seen that, with technical solutions provided in embodiments of the present disclosure, the device for clearing data determines the method for clearing data according to the version of the operation system of the electronic device and whether the auxiliary permission is available in the electronic device. In detail, when the operation system is of the lower version than the preset version, or when the operation system is of the preset version or the higher version than the preset version and the auxiliary permission is unavailable to the user, the target application is triggered to clear the data stored in the electronic device. When the operation system is of the preset version or the higher version than the preset version, and the auxiliary permission is available to the user, the system clearing interface is invoked, the click on the system clearing interface input by the user is simulated, such that the system clearing progress is triggered and started. The data stored in the electronic device is cleared by the system clearing progress. Therefore, with embodiments of the present disclosure, the data stored in the electronic device may be cleared effectively and a down phenomenon of the electronic device may be avoided during the data clearing.

Alternatively, in some possible implementations of the present disclosure, when the target application is triggered to clear the data stored in the electronic device, the first processing unit is configured to trigger the target application to clear cached data corresponding to one or more applications not in a white list of the electronic device.

Alternatively, in some possible implementations of the present disclosure, if the operation system is of the lower version (such as the version lower than Android 6.0), when the target application is triggered to clear the cached data corresponding to the one or more applications not in the white list of the electronic device, the first processing unit is configured to trigger the target application to delete cached files (i.e., files included in Android/data/Appname/cache and Data/data/Appname/cache are deleted, in which Appname is a package name of the one or more applications) corresponding to respective application not in the white list from an operation system root directory and a Data root directory.

If the operation system of the electronic device is of the preset version or the higher version, and the auxiliary permission is unavailable to the user, when the target application is triggered to clear the cached data corresponding to the one or more applications not in the white list of the electronic device, the first processing unit is configured to trigger the target application to delete cached files (i.e., the files included in Android/data/Appname/cache are deleted, in which Appname is a package name of the one or more applications) corresponding to respective application not in the white list from an operation system root directory of the electronic device.

Alternatively, in some possible implementations of the present disclosure, the second processing unit is configured to execute the followings.

Before the system clearing interface of the electronic device is invoked, when an application $A_i$ recorded in a white list is comprised in the electronic device, the second processing unit is configured to amend a package name of the application $A_i$ in a storage path in the electronic device from $P_i$ to $P_i'$. The application $A_i$ is anyone recoded in the white list, and $P_i$ is different from $P_i'$.

After the data stored in the electronic device is cleared by the system clearing progress, the second processing unit is configured to acquire a message indicating a completion of clearing data stored in the electronic device by the system clearing progress; and amend the package name of the application $A_i$ in the storage path from $P_i'$ to $P_i$.

Alternatively, in some possible implementations of the present disclosure, when the data stored in the electronic device is cleared by the system clearing progress, the second processing unit is configured to trigger the system clearing progress to delete a cached file corresponding to respective application from an operation system root directory and a Data root directory of the electronic device.

Figure 5:
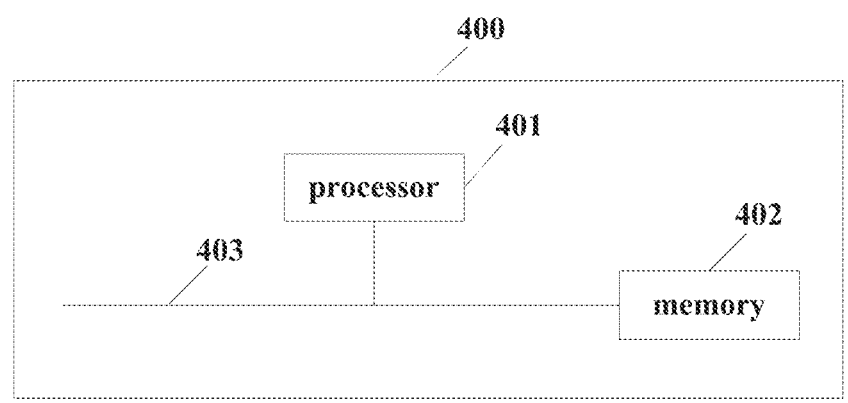
FIG. 5 is a block diagram illustrating an electronic device provided in an embodiment of the present disclosure.

With reference to FIG. 5, FIG. 5 is a block diagram illustrating an electronic device 400 provided in an embodiment of the present disclosure. The electronic device includes an operation system. In detail, the electronic device 400 illustrated as FIG. 5 includes a processor 401, a memory 402 and a bus 403. The processor 401 and the memory 402 are coupled and communicate with each other via the bus 403. The memory 402 is configured to store computer executable program codes. The executable program codes include instructions. When the instructions are executed by the processor 401, a method including blocks S101 to S107 illustrated in FIG. 1, or a method illustrated as FIG. 2, or a method illustrated as FIG. 3 is executed. Descriptions to processes of blocks in method embodiments are not elaborated herein.

Based on a same thought, principles of solving problems via the electronic device provided in embodiments of the present disclosure are similar to that of the method for clearing data provided in embodiments of the present disclosure. Therefore, implementations of the electronic device may refer to implementations of the method described above, which are not elaborated herein for simplification.

Embodiments of the present disclosure further provide a computer program product. When instructions stored in the computer program product are executed by a processor, a method for clearing data is executed. The method includes a part of or all of steps of any one of methods for clearing data recorded in any one of above method embodiments.

Embodiments of the present disclosure further provide a storage medium. When instructions stored in the storage medium are executed by a processor of an electronic device, the processor may perform a method for clearing data. The method includes a part of or all of steps of any one of methods for clearing data recorded in above method embodiments.

In above embodiments, descriptions made to above embodiments emphasize different parts thereof. A Part of embodiments to which detailed descriptions are not made may refer to corresponding descriptions to other embodiments.

It is to be illustrated that, for above-mentioned method embodiments, in order to make descriptions simply, they are described as a combination of a series of actions. However, it should be understood by those skilled in the art, embodiments of the present disclosure are not limited to a sequence of the actions, because according to the present disclosure, some actions may be in other sequence or may be performed simultaneously. Furthermore, it may also be understood by those skilled in the art, embodiments described in the specification are all preferred embodiments, and actions and modules related thereto are not necessary in the present disclosure.

In the embodiments provided by the present disclosure, it should be understood that, the device disclosed may be realized in other manners. For example, device embodiments described above are merely schematically. For example, a division of above-mentioned units is a logic functional division. In practice, other division manners may be utilized. For example, a plurality of units or components may be combined or integrated into another system, or some feature may be omitted or not executed. For another point, coupling or direct coupling or communicational connections shown or discussed herein are realized via some interfaces.

Indirect coupling or communicational connections between devices or units may be electrically, mechanically or in other forms.

The above units described as separated parts may be or may be not physically separated. Parts displayed as units may be or may be not physical units, and they may be located at same position or may be distributed to a plurality of network units. A part of or all of units may be selected according to actual requirements to realize solutions of embodiments of the present disclosure.

In addition, each function cell of the embodiments of the present disclosure may be integrated in a processing module, or these cells may be separate physical existence, or two or more cells are integrated in a processing module. The integrated module may be realized in a form of hardware or in a form of software function modules.

When the integrated module is realized in a form of software function module and is sold or used as a standalone product, the integrated module may be stored in a computer readable storage medium. Based on this understanding, all of or a part of technical solutions of the present disclosure essentially contributing to the prior art, or part of or all of the technical solutions may be embodied in a form of a software product. The computer software product may be stored in a storage medium including several instructions such that a computer device (may be a personal computer, a server, a network device or the like, or may specifically be a processor in a computer device) executes all of or parts of blocks of the method provided in embodiments of the present disclosure. The storage medium may include: a USB drive, a mobile hard disk drive, a magnetic tapes, Compact Disc, Read-Only Memory (ROM), Random Access Memory (RAM) and various media that may store program instructions.

The above embodiments are merely to describe technical solutions of the present disclosure, but not to limit the present disclosure. Although detailed descriptions are made to the present disclosure with reference to above embodiments, it should be understood by those skilled in the art that, technical solutions of the embodiments may be amended or partial technical features may be equivalently changed. However, these amendments or changes may not make the principle of the technical solutions go beyond the spirit and scope of the technical solutions of the embodiments.

What is claimed is:

1. A method for clearing data, applied to an electronic device having an operation system comprising:
    launching a target application;
    acquiring a clearing instruction triggered by a user;
    judging whether the operation system is of a preset version or of a higher version than the preset version;
    judging whether an auxiliary permission is available to the user;
    if the operation system is of a lower version than the preset version, or if the operation system is of the preset version or the higher version and the auxiliary permission is unavailable to the user, triggering the target application to clear data stored in the electronic device; and
    if the operation system is of the preset version or of the higher version and the auxiliary permission is available to the user, invoking a system clearing interface of the electronic device, simulating a click on the system clearing interface input by the user, so as to trigger and start a system clearing progress; wherein the data stored in the electronic device is cleared by the system clearing progress;
    wherein, before invoking a system clearing interface of the electronic device, the method further comprises:
        when an application Ai recorded in a white list is comprised in the electronic device, amending a package name of the application Ai in a storage path of the electronic device from Pi to Pi', wherein the application Ai is anyone recoded in the white list, and Pi is different from Pi'; and
    after clearing the data stored in the electronic device by the system clearing progress, the method further comprises:
        acquiring a message indicating a completion of clearing the data stored in the electronic device by the system clearing progress; and
        amending the package name of the application Ai in the storage path from Pi' to Pi.

2. The method according to claim 1, wherein the target application clearing data stored in the electronic device comprises:
    clearing cached data corresponding to one or more applications not in a white list of the electronic device by the target application.

3. The method according to claim 2, wherein, when the operation system is of the lower version, clearing cached data corresponding to one or more applications not in a white list of the electronic device by the target application comprises:
    deleting a cached file corresponding to respective application not in the white list from an operation system root directory and a Data root directory by the target application.

4. The method according to claim 2, wherein, when the operation system of the electronic device is of the preset version or of the higher version and the auxiliary permission is unavailable to the user, clearing cached data corresponding to one or more applications not in a white list of the electronic device by the target application comprises:
    deleting a cached file corresponding to respective application not in the white list from an operation system root directory of the electronic device by the target application.

5. The method according to claim 1, wherein clearing the data stored in the electronic device by the system clearing progress comprises:
    deleting a cached file corresponding to respective application from an operation system root directory and a Data root directory of the electronic device by the system clearing progress.

6. An electronic device, comprising: a processor, a memory, a display, a communication interface and a bus;
    wherein the processor, the memory, the display and the communication interface are coupled and communicate with each other via the bus;
    the memory is configured to store computer executable program codes, the executable program codes comprises instructions; and when the instructions are executed by the processor, the instructions is configured to cause the electronic device to execute following acts:
    launching a target application;
    acquiring a clearing instruction triggered by a user;
    judging whether the operation system is of a preset version or of a higher version than the preset version;

judging whether an auxiliary permission is available to the user;

if the operation system is of a lower version than the preset version, or if the operation system is of the preset version or the higher version and the auxiliary permission is unavailable to the user, triggering the target application to clear data stored in the electronic device; and if the operation system is of the preset version or of the higher version and the auxiliary permission is available to the user, invoking a system clearing interface of the electronic device, simulating a click on the system clearing interface input by the user, so as to trigger and start a system clearing progress; wherein the data stored in the electronic device is cleared by the system clearing progress;

wherein, before invoking a system clearing interface of the electronic device, the method further comprises:

when an application Ai recorded in a white list is comprised in the electronic device, amending a package name of the application Ai in a storage path of the electronic device from Pi to Pi', wherein the application Ai is anyone recoded in the white list, and Pi is different from Pi'; and after clearing the data stored in the electronic device by the system clearing progress, the method further comprises:

acquiring a message indicating a completion of clearing the data stored in the electronic device by the system clearing progress; and amending the package name of the application Ai in the storage path from Pi' to Pi.

7. The electronic device according to claim 6, wherein the target application clearing data stored in the electronic device comprises:

clearing cached data corresponding to one or more applications not in a white list of the electronic device by the target application.

8. The electronic device according to claim 7, wherein, when the operation system is of the lower version, clearing cached data corresponding to one or more applications not in a white list of the electronic device by the target application comprises:

deleting a cached file corresponding to respective application not in the white list from an operation system root directory and a Data root directory by the target application.

9. The electronic device according to claim 7, wherein, when the operation system of the electronic device is of the preset version or of the higher version and the auxiliary permission is unavailable to the user, clearing cached data corresponding to one or more applications not in a white list of the electronic device by the target application comprises:

deleting a cached file corresponding to respective application not in the white list from an operation system root directory of the electronic device by the target application.

10. The electronic device according to claim 6, wherein clearing the data stored in the electronic device by the system clearing progress comprises:

deleting a cached file corresponding to respective application from an operation system root directory and a Data root directory of the electronic device by the system clearing progress.

11. A non-transitory computer readable storage medium, having computer programs stored therein, when the computer programs are executed by a processor of an electronic device, the device may perform a method for clearing data, wherein the method for clearing data comprises:

launching a target application;

acquiring a clearing instruction triggered by a user;

judging whether the operation system is of a preset version or of a higher version than the preset version;

judging whether an auxiliary permission is available to the user;

if the operation system is of a lower version than the preset version, or if the operation system is of the preset version or the higher version and the auxiliary permission is unavailable to the user, triggering the target application to clear data stored in the electronic device; and if the operation system is of the preset version or of the higher version and the auxiliary permission is available to the user, invoking a system clearing interface of the electronic device, simulating a click on the system clearing interface input by the user, so as to trigger and start a system clearing progress; wherein the data stored in the electronic device is cleared by the system clearing progress;

wherein, before invoking a system clearing interface of the electronic device, the method further comprises:

when an application Ai recorded in a white list is comprised in the electronic device, amending a package name of the application Ai in a storage path of the electronic device from Pi to Pi', wherein the application Ai is anyone recoded in the white list and Pi is different from Pi'; and after clearing the data stored in the electronic device by the system clearing progress, the method further comprises:

acquiring a message indicating a completion of clearing the data stored in the electronic device by the system clearing progress; and amending the package name of the application Ai in the storage path from Pi' to Pi.

12. The storage medium according to claim 11, wherein the target application clearing data stored in the electronic device comprises:

clearing cached data corresponding to one or more applications not in a white list of the electronic device by the target application.

13. The storage medium according to claim 12, wherein, when the operation system is of the lower version, clearing cached data corresponding to one or more applications not in a white list of the electronic device by the target application comprises:

deleting a cached file corresponding to respective application not in the white list from an operation system root directory and a Data root directory by the target application.

14. The storage medium according to claim 12, wherein, when the operation system of the electronic device is of the preset version or of the higher version and the auxiliary permission is unavailable to the user, clearing cached data corresponding to one or more applications not in a white list of the electronic device by the target application comprises:

deleting a cached file corresponding to respective application not in the white list from an operation system root directory of the electronic device by the target application.

15. The storage medium according to claim 11, wherein clearing the data stored in the electronic device by the system clearing progress comprises:

deleting a cached file corresponding to respective application from an operation system root directory and a Data root directory of the electronic device by the system clearing progress.

\* \* \* \* \*